Jan. 5, 1965   R. A. KLEIST ETAL   3,164,802
INDUCTIVE LOOP VEHICLE PRESENCE DETECTOR
Filed March 13, 1961   3 Sheets-Sheet 1

INVENTORS
ROBERT A. KLEIST
JOHN SCARBROUGH
BY
Edward A. Robinson
ATTORNEY

Jan. 5, 1965 R. A. KLEIST ETAL 3,164,802
INDUCTIVE LOOP VEHICLE PRESENCE DETECTOR
Filed March 13, 1961 3 Sheets-Sheet 3

INVENTORS
ROBERT A. KLEIST
JOHN SCARBROUGH
BY
Edward A. Robinson
ATTORNEY

United States Patent Office 3,164,802
Patented Jan. 5, 1965

3,164,802
INDUCTIVE LOOP VEHICLE PRESENCE
DETECTOR
Robert A. Kleist, Sunnyvale, and John Scarbrough, Palo
Alto, Calif., assignors to General Precision, Inc.,
Binghamton, N.Y., a corporation of Delaware
Filed Mar. 13, 1961, Ser. No. 95,236
3 Claims. (Cl. 340—38)

This invention relates to arrangements for sensing the presence of a metal mass such as a motor vehicle or a railroad car in a specific location, and more particularly, this invention relates to electrical circuits including inductive loops for generating magnetic field patterns which will be affected by the introduction of a metal mass to cause variations in the inductive values which in turn will affect the electrical circuits.

Heretofore, inductive loops embedded in the paving of taxiways or traffic lanes have been used to detect the presence of taxiing aircraft and the like. These systems have been found to be adversely affected by changes in weather conditions, and particularly to collections of moisture, snow, ice and the like upon and within the ground or paving surface into which the loop may have been embedded. Such changes in weather and in environmental conditions may have considerable effect upon the losses in various portions of the loop such that the effective resistance varies causing variations of the "Q" factor of the loop. The Q factor of a tuned circuit or an inductance coil is a measure of the sharpness of tuning of that circuit or coil, and is defined as the ratio of the inductive reactance to the effective resistance. The prior art systems for sensing taxiing aircraft have relied at least in part upon changes in the Q characteristics of an inductive loop, and therefore, are highly susceptible to changes in weather and in environmental conditions.

These prior art devices have been made to operate by sensing a rate of change in the Q of an inductive loop. The rate of change of the Q factor will be considerable when an aircraft or other vehicle moves into or out of the magnetic field pattern of the loop, and therefore ordinary weather and varying environmental conditions which cause the Q of the loop to change at a slow gradual rate will have little influence upon the system. However, certain unusual weather conditions may cause false signals in such a system. For example, if a taxiway or traffic lane is wet and at 32° temperature, the moisture can freeze with such an abrupt transition that an aircraft presence detecting system relying upon the rate of change of a Q factor in an inductive loop will generate false signals.

Although changes in environmental conditions will greatly affect the losses and the Q factor of a circuit, it has been found that the pure inductive value of a loop which has been embedded in the paving material of a street or the like will remain substantially constant regardless of the changes in the environmental conditions which will affect the losses of the Q factor. Indeed, an inductive loop of this nature has been installed and embedded in the paving of a street in the city of Chicago, and the inductance value of the loop has been periodically measured while being subjected to various types of weather, moisture and temperature conditions. This loop has been found to be substantially constant in its inductive value of .06 millihenry with a variation not exceeding 1%.

Any presence detection system relying upon a rate of change of the inductance or Q factor characteristics of a loop would fail to detect the presence of a vehicle which happened to stall or be parked within the field pattern of the loop after a period of time. Thus, in the above example, if a taxiing aircraft should stall at a critical point on the taxiway, its presence would be initially sensed, but after a short time lapse, the aircraft's presence would go undetected.

It is an object of this invention to provide an improved inductive loop arrangement for sensing a metal mass which will remain substantially unaffected by environmental changes caused by weather or the like, and which does not rely on any rate of change of parameters of the loop.

It is a further object of this invention to provide an improved circuit including an inductive loop for detecting the presence of a metal mass, and more specifically it is an object to provide a circuit responsive only to the inductive value of the loop, and insensitive to changes in the Q factor of the loop and to losses or coupling changes affecting the loop.

Numerous other objects and advantages will be apparent throughout the progress of the specification which follows. The accompanying drawings illustrate certain selected embodiments of the invention and the views therein are as follows.

Briefly stated, according to this invention, an oscillator is provided including an inductive loop which may be embedded in paving defining a particular area in which the presence of a vehicle may be detected. The loop generates a magnetic field pattern in an area thereabove, and when a metal mass moves into the magnetic field of the loop, the inductive value thereof varies and the frequency of the oscillator likewise varies. The variation in oscillator frequency is detected to provide an output signal for actuation of a device or alarm circuits.

Figure 1:
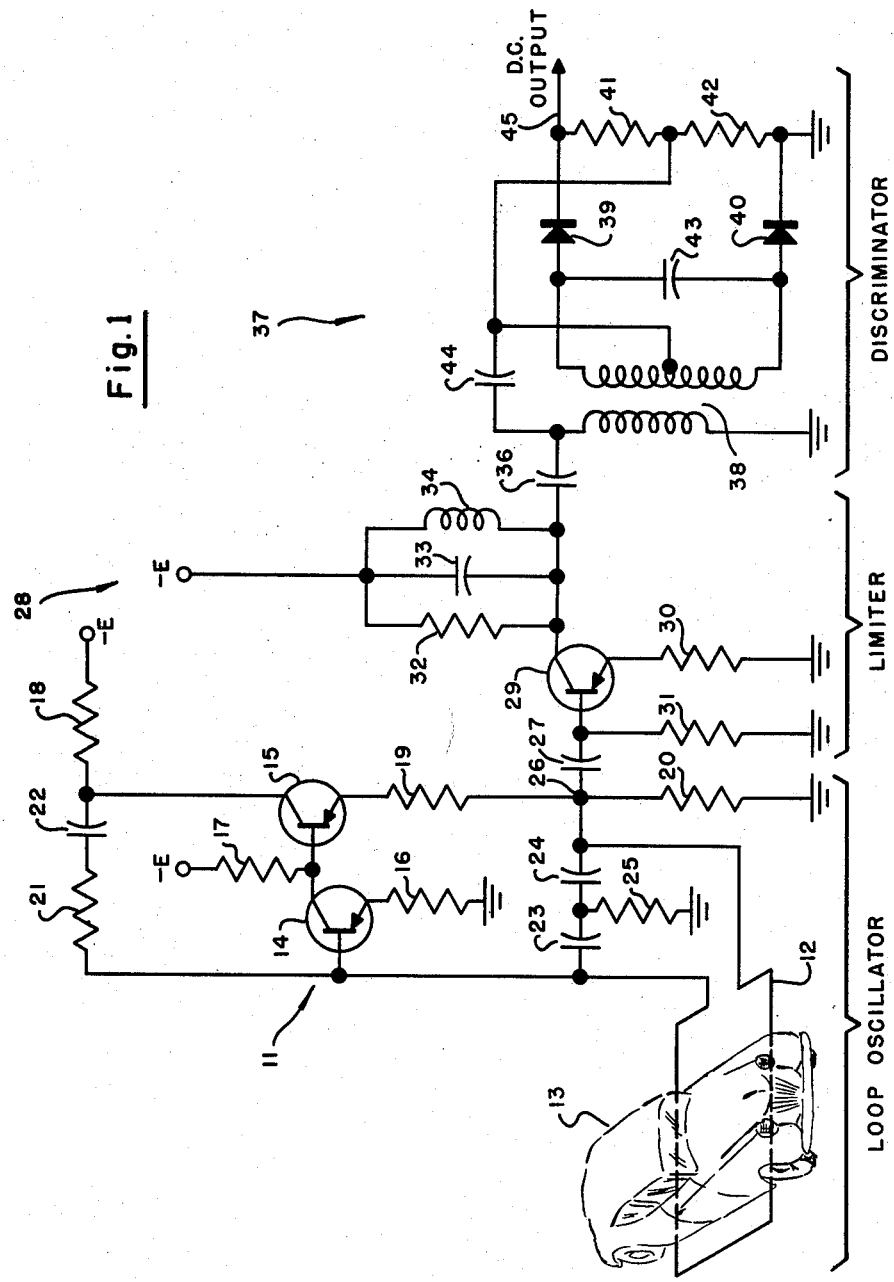
FIGURE 1 is a schematic diagram of an electrical circuit for sensing the presence of a metal mass.

As shown in FIGURE 1, the presence detector comprises an oscillator circuit 11 including an inductive loop 12 which may be embedded in the paving in a lane of traffic for sensing a metallic mass such as an automobile 13. The oscillator circuit 11 includes two transistors 14 and 15 coupled together as an amplifier. The transistor 14 includes an emitter electrode which may be coupled to ground by a resistor 16 and a collector electrode which may couple to a negative reference potential —E by a load resistor 17. The collector electrode of the transistor 14 is directly connected to the base electrode of the transistor 15. The collector electrode of the transistor 15 is coupled to the negative reference potential —E by a load resistor 18; and the emitter electrode thereof is coupled to ground potential by two serially connected resistors 19 and 20. An RC circuit including a resistor 21 and a capacitor 22 is coupled between the collector electrode of the transistor 15 and the base electrode of the transistor 14, and provides a positive feedback path which is not particularly frequency sensitive. The transistors 14 and 15 combined with the RC circuit 21–22 constitute an oscillator circuit, the frequency of which is subject to control.

The inductive loop 12 in combination with two serially connected capacitors 23 and 24 and a resistor 25, comprises a bridge T null network. This network is coupled between a series connection point 26 in the emitter circuit of the transistor 15 and the base electrode of the transistor 14, and constitutes a negative feedback path for the amplifier circuit of the transistors 14 and 15. The null network provides a negative feedback path for all frequencies except a particular frequency to which the network is tuned. Thus, the oscillator 11 includes a non-frequency sensitive positive feedback path 21–22 and the null network which provides negative feedback for all frequencies except the particular frequency to which it is tuned. At the tuned frequency, the network presents an infinite impedance or effectively an open circuit to block negative feedback, and to permit oscillation at that frequency. Since the capacitors 23 and 24 are constant in value, the null frequency of the network which will be the frequency of oscillation of the circuit 11 is determined by the inductive value of the loop 12. This inductive value may be varied by the introduction of a metal mass into the magnetic field of the loop 12 which will generally coincide with that area of the traffic lane or roadway immediately above the loop.

A capacitor 27 couples the oscillator signal to a limiter circuit 28 including a transistor 29. A resistor 30 couples the emitter electrode of the transistor 29 to ground potential and another resistor 31 couples the base electrode of the transistor 29 to ground potential. A resistor 32, a capacitor 33, and an inductance 34, all connected in parallel provide a coupling between the collector electrode of the transistor 29 and the negative reference potential —E. The operation of the limiter circuit 28 may be understood by considering the analogy of a grid leak resistor in a thermionic vacuum tube circuit. The resistor 31 operates similarly to a grid leak resistor by providing a negative bias to the base electrode of the transistor 29 which bias assumes a value dependent upon the level of conduction of the transistor. Obviously, the coupling capacitor 27 will block flow of direct current to the base electrode of the transistor 29, and the bias of this electrode appears as a voltage drop across the resistor 31. This bias upon the base electrode acts to control the level of conduction of the transistor 29 which in turn determines the bias across the resistor 31. As a result the transistor 29 will be self-biased, and the signal appearing at the collector electrode will be of constant amplitude. The signal from the transistor 29 is impressed upon the tuned circuit including the capacitor 33 and the inductance 34 having a low Q factor indicated by the use of the parallel resistor 32. Therefore, the output signal from the limiter 28 will be substantially flat in its characteristic over a range of frequencies which may be developed by the oscillator circuit 11.

A capacitor 36 provides a coupling from the limiter circuit 28 to a discriminator circuit 37. The discriminator circuit 37 illustrated in FIGURE 1 includes a radio frequency transformer 38, two diodes 39 and 40, a pair of serially connected load resistors 41 and 42 and capacitors 43 and 44. This circuit is essentially shown and described on page 1153 of "Radiotron Designer's Handbook," published by the Wireless Press of Sidney, Australia, in 1952 and distributed in the United States by the Radio Corporation of America. This circuit is sensitive to an input frequency, and functions to develop a direct voltage at an output terminal 45 determined by a shift or variation of the input frequency.

Figure 2:
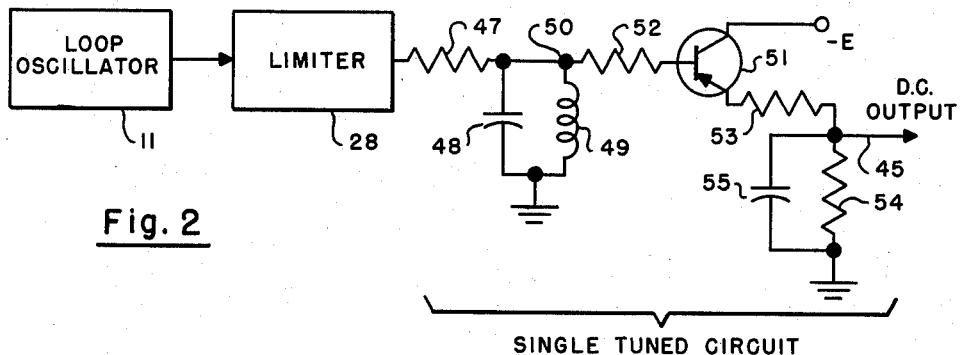
FIGURE 2 is a schematic diagram of another embodiment of this invention.

FIGURE 2 shows another embodiment of this invention, and particularly another means for frequency discrimination. A loop oscillator 11 and the limiter 28 may be as shown in FIGURE 1. In this circuit, the constant amplitude signal from the limiter 28 is coupled via a resistor 47 to a tuned circuit including a parallel connected capacitor 48 and an inductance 49. The tuned circuit 48–49 may have a high Q factor and be sharply tuned. The resistor 47 and the tuned circuit 48–49 together provide a load impedance for the limiter circuit 28, and the potential at a point 50 will depend upon the respective voltage drops across the resistor 47 and the tuned circuit 48–49. If the oscillator frequency differs from the resonant frequency of the tuned circuit 48–49 there will be only a nominal voltage drop thereacross, and there will be a substantial voltage drop across the resistor 47; and therefore, the amplitude of the wave appearing at the point 50 will be nominal. On the other hand, if the oscillator frequency approaches the resonant frequency of the circuit 48–49, the voltage drop thereacross will increase and the amplitude of the signal at the point 50 will increase. The signal appearing at the point 50 is coupled to the base electrode of a transistor 51 by a resistor 52.

The transistor 51 is connected as an emitter follower with its collector electrode directly connected to the negative reference potential —E and the emitter electrode coupled to ground by a pair of serially connected resistors 53 and 54. The transistor 51 will rectify the wave to sense the peak voltage thereof, and a capacitor 55 will integrate and store an output voltage corresponding to the peak voltage or amplitude of the wave of the point 50.

The amplitude of the wave appearing at the point 50 will depend upon the frequency of the oscillator 11 as compared with the resonant frequency of the tuned circuit 48–49, and the direct potential output will be determined by that amplitude. Thus, it will be appreciated that the level of the direct voltage output is a measure of the oscillator frequency which will be influenced by the presence or absence of a metallic mass in the inductive loop 12.

Figure 7:
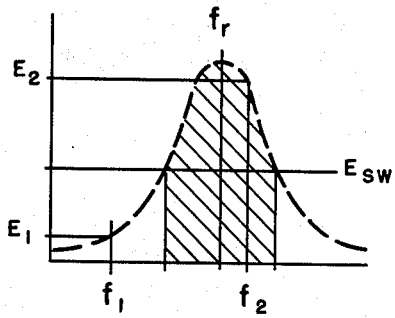
FIGURE 7 is a graphical representation illustrating the method of detection of the circuit of FIGURE 2.

As shown in FIGURE 7, a frequency $f_1$ may be generated by the oscillator 11 when no metallic mass or vehicle 13 is present in the field pattern of the loop 12. In this condition, the amplitude of the wave appearing at the point 50 and the corresponding direct potential stored by the capacitor 55 is represented by the voltage $E_1$. When a metallic mass is introduced into the loop, the inductance is decreased and the oscillator frequency increases to a value such as $f_2$. Since $f_2$ is reasonably close to the resonant frequency $f_r$ of the tuned circuit 48–49, the impedance drop thereacross will be considerable, and the amplitude of the voltage wave at the point 50 will be at a high value such as $E_2$, FIGURE 7. Since the transistor 51 effectively senses and rectifies the peak values of the voltage wave appearing at point 50, the direct current output voltage which is stored in the capacitor 55 will correspond to the amplitude of this wave. If a subsequent circuit or relay requires a voltage level $E_{sw}$ for effective operation, it will be appreciated that any oscillator frequency appearing in the cross-hatched area of FIGURE 7 will operate subsequent switches while voltages outside this cross-hatched zone will be insufficient to hold a subsequent relay. Thus, if the frequency of the loop oscillator 11 is $f_1$ with an empty loop and changes to $f_2$ when a metal mass is introduced into the loop, the circuit of this invention will sense the presence of such a mass to selectively generate an actuation voltage at the output terminal thereof. In a certain selected embodiment of this invention, the normal oscillator frequency $f_1$ was of the order of 90 killocycles, and with the introduction of a metallic mass into the loop 12, the oscillator shifted to a frequency $f_2$ of 93 killocycles.

Figure 3:
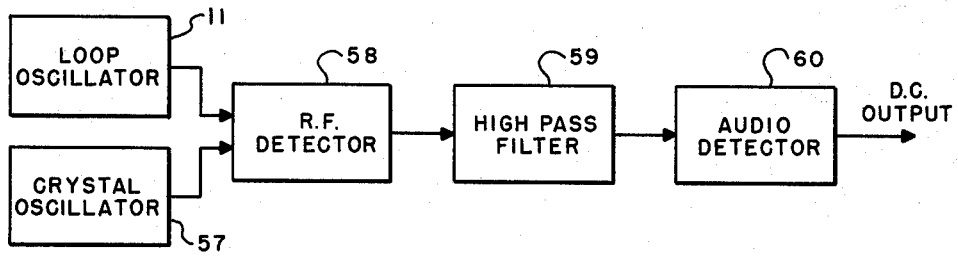
FIGURE 3 is a circuit diagram of a further embodiment of this invention.

The circuit of FIGURE 3 provides a first oscillator 11 containing a loop and being substantially the same circuit as shown in FIGURE 1, and further provides a constant frequency oscillator 57 which may be controlled by a crystal. This crystal-controlled oscillator 57 may be an oscillator circuit disclosed in a United States patent application Serial No. 15,914, entitled "Crystal Controlled Transistorized Oscillator," filed on March 18, 1960, by C. S. Jones and J. Scarbrough and assigned to the same assignee as the instant application. Both the loop oscillator 11 and the crystal-controlled oscillator 57 pass signals to a radio frequency detector circuit 58, which circuit combines the signals to produce a signal having a frequency equal to the difference between the two oscillator frequencies. The circuit of 58 is substantially a heterodyne circuit and is fully disclosed by FIGURE 5 to be discussed subsequently. The difference signal may be an audio frequency, and will vary widely if the two oscillators 11 and 57 are tuned to radio frequencies approximately equal to each other. The audio frequency from the circuit 58 is impressed upon a high pass filter circuit 59 which may be of any conventional type, for example, see the resistance-capacitance filter disclosed on page 172 of the "Radiotron Designer's Handbook," supra. Signals are passed from the filter circuit 59 to an audio detector circuit 60 which generates a direct potential output corresponding to the amplitude of the audio signals passed by the high pass filter 59.

Figure 8:
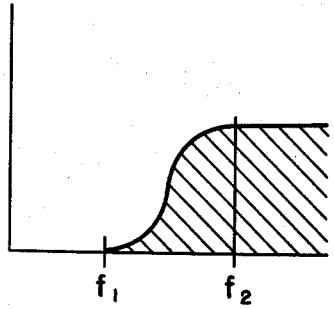
FIGURE 8 is a graphical representation of a method of audio detection of FIGURES 3 and 4.

FIGURE 8 illustrates the response characteristics of the circuit of FIGURE 3. The loop oscillator 11 may be tuned to have a normal frequency substantially equal to the crystal oscillator 57 when no metal mass is in the loop. Under these conditions of substantially equal frequencies, the difference frequency generated by the circuit 58 will be low and will be blocked by the high pass filter 59. Therefore, no signal will be passed to the audio detector circuit 60 and no direct current output will appear therefrom. When a metal mass appears in the field of the loop of the oscillator 11, its frequency increases and the difference frequency from the detector circuit 58 will increase substantially. From the response curve of FIGURE 8 it may be noted that when the frequency of the loop oscillator 11 increases from $f_1$ to $f_2$, the output wave from the high pass filter 59 will increase from substantially zero to a substantial value, and the direct current output of the audio detector circuit 60 will correspondingly increase to provide a selective actuation voltage for switching circuits.

Figure 5:
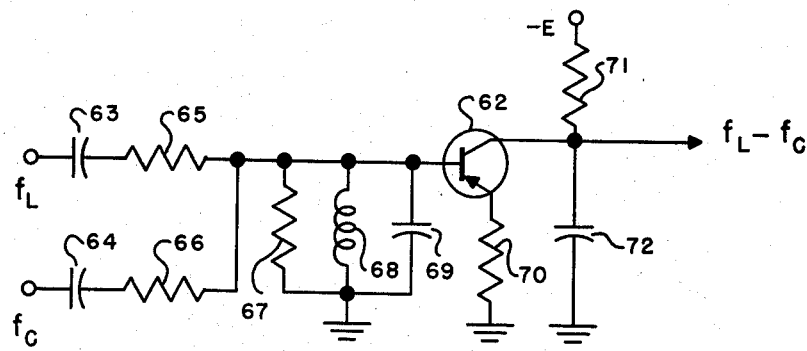
FIGURE 5 is a diagram of a circuit of a radio frequency detector which is indicated as a block in FIGURES 3 and 4.

The radio frequency oscillator circuit for obtaining an audio difference frequency between two input RF frequencies is illustrated by FIGURE 5. The frequency from the loop oscillator $f_L$ and the frequency from the crystal-controlled oscillator $f_C$ are both impressed upon the base electrode of a transistor 62 via coupling capacitors 63 and 64 and by load limiting resistors 65 and 66. A low Q filter circuit including a resistor 67, an inductance 68 and a capacitor 69 mutually connected in parallel is coupled between the base electrode of the transistor 62 and a point of ground potential. The emitter electrode of transistor 62 is coupled to ground by a resistor 70, and the collector electrode is coupled to the negative reference potential —E by a load resistor 71. A capacitor 72 functions as a low pass filter by effectively short circuiting the higher frequencies which would otherwise appear at the collector electrode of the transistor 62. As a result of the filtering action of the capacitor 72, only the lowest of the heterodyne frequencies will appear at the collector electrode and output terminal of the transistor 62. Thus, as indicated by FIGURE 5, the difference frequency $(f_L - f_C)$ is passed by the radio frequency detector circuit.

Figure 6:
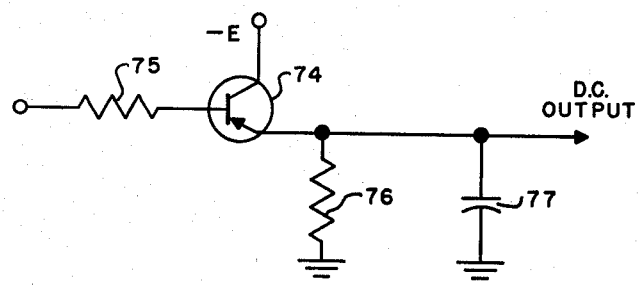
FIGURE 6 is a diagram of an audio detector circuit shown as a block in FIGURES 3 and 4.

The audio detector circuit 60 is shown by FIGURE 6 and comprises a transistor 74 which is coupled to receive audio signals at its base electrode via a resistor 75. The transistor 74 is connected as an emitter follower with the collector electrode connected directly to the negative reference potential —E, and the emitter electrode coupled to ground by a resistor 76. A capacitor 77 integrates the final output to provide a direct potenial level corresponding to the amplitude of the audio wave impressed upon the base electrode of the transistor 74.

Figure 4:
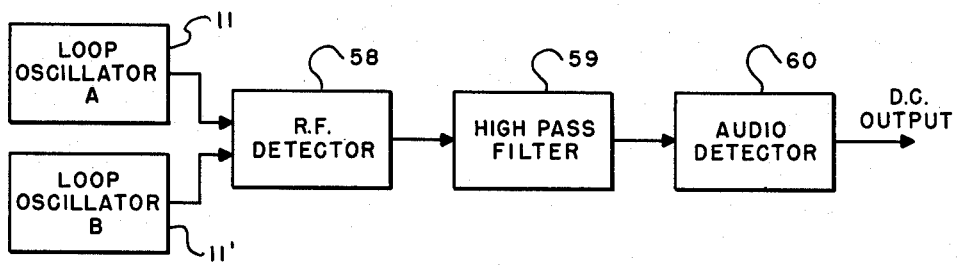
FIGURE 4 is a circuit diagram of yet another embodiment of this invention.

FIGURE 4 illustrates a further embodiment of this invention similar to that of FIGURE 3. Two loop oscillators 11 and 11' are employed each similar to this circuit shown in FIGURE 1. The loop of one of the oscillators is placed in a traffic lane for sensing the presence of vehicles moving therealong, and the loop of the other oscillator, similar in dimensions and characteristics, is located in an area inaccessible to vehicular traffic. The two loop oscillators are tuned to substantially the same normal frequency, and since the loop oscillator #2 is removed from the possibility of a metal mass entering the field thereof, its frequency will be constant. In this respect the loop oscillator #2 serves the same function as the constant frequency crystal-oscillator 57 of FIGURE 3, and when a metal mass is introduced into the field of the loop of the oscillator #1 the change in frequency is detected by the circuit 58 to provide an increased audio frequency which will pass the filter circuit 59, and will cause an output signal from the detector circuit 60.

Although the inductive values of the loops 12 are substantially constant in all types of weather and environmental conditions, the circuit of FIGURE 4 would compensate for even a small variation since the loops of the oscillators 11 and 11' would be similarly affected by changes in environmental conditions. If both oscillators deviate similarly from a normal frequency, the difference frequency generated by the detector circuit 58 will continue to remain constant.

Another application of the circuit in FIGURE 4 would be to place the loop of the oscillators 11 and 11' in successive locations along a traffic lane. In such an application the oscillator #1 will first vary in frequency as a vehicle enters the field of its loop, and at a subsequent time the oscillator #2 will vary in frequency as this same vehicle entered the field of its loop. Thus, an indication of the vehicles movement along the traffic lane would be produced. Or let us assume that a device such as a parking lot gate is to be operated if a first vehicle moves into a first location provided that no second vehicle is then occupying a second location. The circuit of FIGURE 4 could provide a selective output voltage for actuation of the device by positioning the loop of a first oscillator at the first location and the loop of a second oscillator at the second location. The normal radio frequencies of the two oscillators may be spaced slightly from each other along a spectrum such that a shift in the frequency of the first oscillator will increase the spread or difference between the two frequencies to produce an increased audio frequency resulting in an output signal for actuation of the device. On the other hand, a shift in the frequency of the second oscillator will merely decrease the spread between the two RF frequencies and will not produce an output signal. If vehicles enter the fields of both loops, both RF frequencies will shift with no resulting change in the audio difference frequency and no resulting output signal.

For example, oscillator A may have a normal frequency of 91 kilocycles which will shift to 93 kilocycles when a metal mass is introduced into the field of a first loop; and oscillator B may have a normal frequency of 90 kilocycles which will shift to 92 kilocycles when a metal mass is introduced into the field of a second loop. In this case, the difference in frequencies when no metal mass is near either loop will be 1,000 cycles, the difference in frequencies when a metal mass is introduced into the field of loop B is also 1,000 cycles, and the difference in frequencies when a metal mass is introduced into both loops will likewise be 1,000 cycles. However, if a metal mass is introduced into the field of loop A while no metal mass is near the loop B, the frequency difference will be 3,000 cycles. If the high pass filter 59 is tuned to reject audio frequencies of the 1,000 cycle range, but is tuned to pass a 3,000 cycle frequency an output signal will only appear when the loop oscillator A shifts in frequency with no corresponding frequency shift by the loop oscillator B.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for sensing the presence of a vehicle, comprising:
   a first oscillator circuit including a frequency determining loop;
   means fixedly positioning said loop in spaced relation to a path for vehicles, said loop defining an area greater than the area occupied by any of said vehicles;
   said frequency determining loop exhibiting a normal value of inductance which varies when a vehicle moves near and into said area defined by said loop thereby varying the frequency of oscillation generated by said circuit;
   a substantially constant frequency oscillator circuit for generating a frequency different than any frequency generated by said first oscillator circuit;
   means applying the frequencies generated by said first and said substantially constant frequency oscillator circuits to a detector, said detector providing an audio frequency equal to the difference in frequency between said generated oscillation frequencies; and
   means coupled to said detector for providing a direct voltage level indicative of the instantaneous difference in frequency generated by said circuits.

2. Apparatus for sensing the presence of a vehicle comprising,
   a first oscillator including a frequency determining inductive loop;
   means fixedly positioning said loop in a plane underlying a path for vehicles, said loop having a length perpendicular to said path greater than the width of any vehicle traveling along said path;
   said loop and said first oscillator being operable to generate a magnetic field in a predetermined area of said path;
   said loop having a selected value of inductance which decreases when a vehicle moves into the area and into the magnetic field;
   said oscillator having a normal frequency of oscillation which increases as the inductance of said loop decreases;
   a second oscillator having stable characteristics for generating a frequency of oscillations less than the frequency of oscillation generated by said first oscillator;
   a detector circuit coupled to both of said first and second oscillators and operable to provide an alternating current having a frequency equal to the difference between the oscillation frequencies of the first and second oscillators;
   a high pass filter coupled to said detector and operable to pass said alternating current only when the oscillation frequency of said first oscillator increases above said normal frequency;
   and means coupled to said high pass filter operable to provide a direct current output signal in response to said alternating current passed by said high pass filter.

3. Apparatus for sensing the presence of a vehicle, comprising:
   a first oscillator circuit including a first frequency determining loop and a second oscillator circuit including a second frequency determining loop;
   means fixedly positioning said first and second loops at successive locations in a plane underlying a vehicle traffic lane, each of said loops defining an area larger than the area occupied by any vehicle;
   each of said loops having a normal value of inductance which decreases when a vehicle moves into the area defined by the loop;
   said first oscillator having a normal frequency of oscillation which increases when the inductance of said first loop decreases and said second oscillator having a normal frequency of oscillation which increases when the inductance of said second loop decreases;
   said normal frequencies being spaced slightly from each other along a spectrum such that an increase only in the frequency of said first oscillator increases the difference in the frequencies generated by said first and second oscillators and an increase only in the frequency of said second oscillator decreases the difference in the frequencies generated by said first and second oscillators; and
   means coupled to said first and second oscillators for providing a direct current output signal only when the difference in the frequencies generated by said first and second oscillators increases.

References Cited by the Examiner

UNITED STATES PATENTS

| | | | |
|---|---|---|---|
| 2,343,987 | 3/44 | Lindsay et al. | 331—65 XR |
| 2,376,659 | 5/45 | Chireix | 324—3 |
| 2,393,717 | 1/46 | Speaker | 324—3 XR |
| 2,421,771 | 6/47 | Browning | 331—65 |
| 2,442,805 | 6/48 | Gilson | 324—3 XR |
| 2,613,249 | 10/52 | Babb | 331—43 XR |
| 2,779,904 | 1/57 | Barrown | 331—65 |
| 2,819,447 | 1/58 | Harmon | 331—65 |
| 2,891,159 | 6/59 | Politi | 331—65 |

NEIL C. READ, *Primary Examiner.*

E. JAMES SAX, THOMAS B. HABECKER, *Examiners.*